March 24, 1925. 1,530,866

C. E. WAKEFIELD

BALL RACE REMOVER

Filed Jan. 21, 1924

C. E. Wakefield, Inventor

By C. A. Snow & Co.
Attorneys

Patented Mar. 24, 1925.

1,530,866

UNITED STATES PATENT OFFICE.

CHARLES E. WAKEFIELD, OF ANADARKO, OKLAHOMA.

BALL-RACE REMOVER.

Application filed January 21, 1924. Serial No. 687,597.

*To all whom it may concern:*

Be it known that I, CHARLES E. WAKEFIELD, a citizen of the United States, residing at Anadarko, in the county of Caddo and State of Oklahoma, have invented a new and useful Ball-Race Remover, of which the following is a specification.

This invention aims to provide a simple means whereby the inner ball races of automobile wheels may be removed readily—although the device described and claimed may be put to other uses.

It is within the province of the disclosure to improve generally and to enhance the utility of devices of that sort to which the invention appertains.

Although one form of the invention has been selected as a material embodiment, it is to be understood that, within the scope of what is claimed, changes can be made by a mechanic, without departing from the spirit of the invention or placing the utility thereof in jeopardy.

In the drawings—

Figure 1:
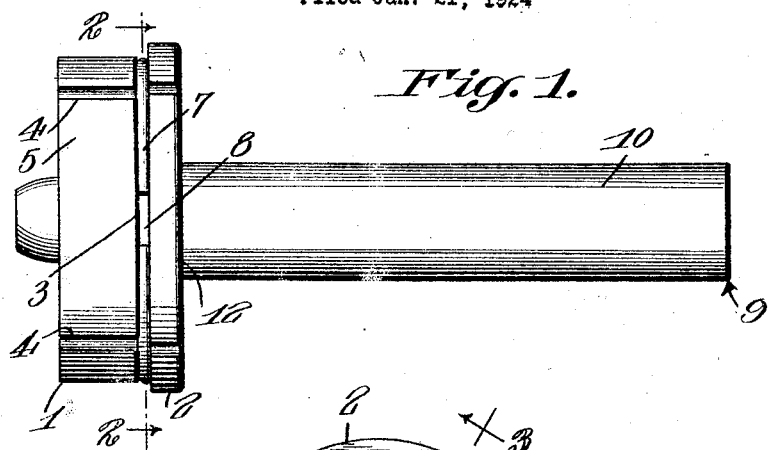
Figure 1 shows, in side elevation, a device constructed in accordance with the invention.
Figure 2:
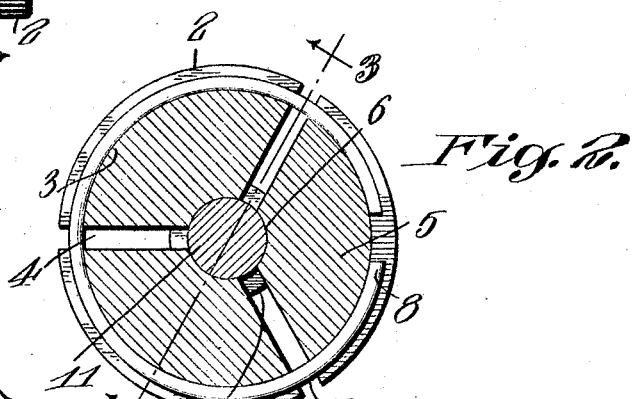
Figure 2 is a section on the line 2—2 of Figure 1.

In carrying out the invention, there is provided a head 1 which is of circular outline, the head being provided at one end with an outstanding flange 2, there being a circumferential seat 3 in the head, the seat being located immediately adjacent to the flange 2. The head 1 is divided radially, as at 4, to form a plurality of approximately wedge-shaped parts 5 having curved seats 6 at their inner ends, the seats forming, in the expansible head 1, an opening for the reception of an expander, which will be described hereinafter. In order to draw the parts 5 of the head 1 inwardly, and to hold them together, there is supplied a prehensile spring ring 7, extended about the parts 5 and located in the seat 3, the ends of the ring 7 being spaced apart slightly, as indicated at 8.

The expander 9 is in the form of a bar comprising a body 10 having a reduced end 11 forming a shoulder 12, the end 11 terminating in a tapered tip 14.

Figure 3:
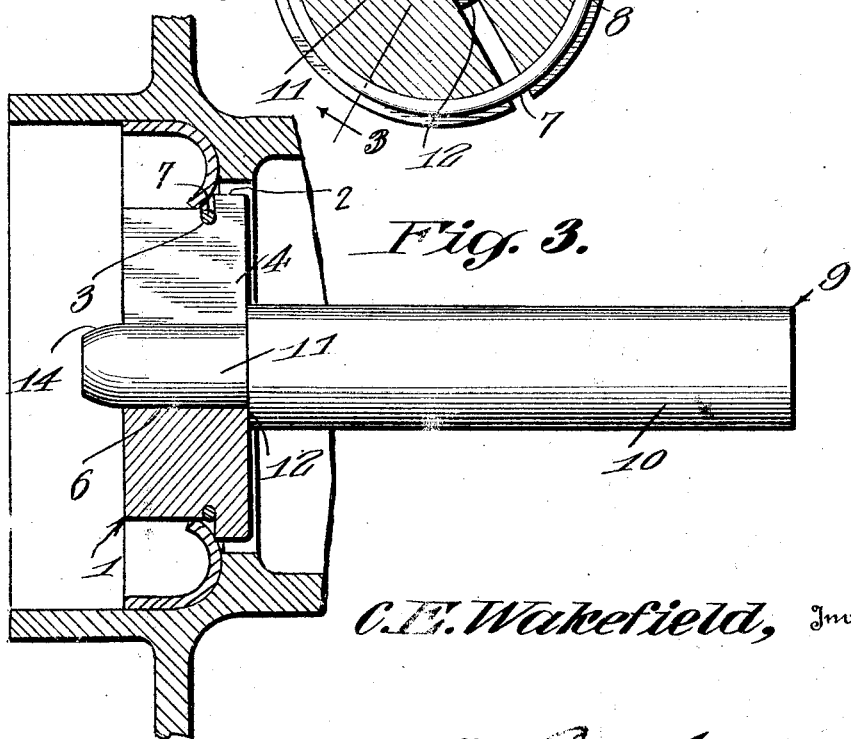
Figure 3 is a section on the line 3—3 of Figure 2.

The head 1 is placed within the race which is to be removed, the flange 2 cooperating with the race. The end 11 of the expander is inserted into the seats 6 of the parts 5 of the head 1, the tapered tip 14 effecting an expansion of the head 1 and causing the head to fit closely within the ball race which is to be removed, the shoulder 12 of the expander ultimately coming into contact with the head 1, as shown in Figure 3. A few hammer blows on the body 10 of the expander 9 will serve to remove the ball race, the race being carried by the head 1.

Having thus described the invention, what is claimed is:

1. In a bushing remover, a head provided at its inner end with a flange which outstands sufficiently to engage the end of the bushing to be removed, the head being divided radially into expansible parts provided at their inner ends with seats forming an opening; spring means for holding the parts of the head together; and a combined expander and expelling plunger including a reduced cylindrical member which fits closely in the opening of the head to prevent the expander and the plunger from tilting in the head, the extremity of the cylindrical member being tapered to effect an expansion of the head, the said member forming an abrupt shoulder which engages the inner end of the head positively, to cause the head to advance with the expander and the plunger when the expander and the plunger is driven.

2. A device of the class described, constructed as set forth in claim 1, and further characterized by the fact that the spring means is in the form of a prehensible spring, the head provided with a circumferential groove wherein the spring is received, the groove being located closely adjacent to the flange, whereby the flange will aid in holding the spring in the groove when the head and the combined expander and expelling plunger are advanced.

In testimony that I claim the foregoing as my own, I have hereto affixed my signature in the presence of two witnesses.

CHARLES E. WAKEFIELD.

Witnesses:
GRAYCE HUTCHINS,
D. M. SCISM.